United States Patent [19]

Pascal

[11] 4,217,944
[45] Aug. 19, 1980

[54] MOLDED HEAVY DUTY WHEEL

[76] Inventor: Robert A. Pascal, 1350 Forest, Highland Park, Ill. 60035

[21] Appl. No.: 845,074

[22] Filed: Oct. 25, 1977

[51] Int. Cl.² .............................................. B60C 1/00
[52] U.S. Cl. ................................... 152/323; 16/18 R; 474/192; 301/63 PW; 301/63 DD
[58] Field of Search ............ 152/379.1, 151, 323–329; 301/63 PW, 63 DD, 63 R; 74/230.7; 16/18 R, 45, 18 CG

[56] References Cited

U.S. PATENT DOCUMENTS

| | | | |
|---|---|---|---|
| 857,335 | 6/1907 | Ephraim | 152/323 X |
| 1,576,924 | 3/1926 | Malloy | 152/379.1 |
| 2,592,164 | 4/1952 | Maxam | 301/63 PW |
| 2,673,470 | 3/1954 | Cosmos | 152/323 X |
| 2,766,802 | 10/1956 | Grobowski | 301/63 PW |
| 2,943,889 | 7/1960 | Woldring et al. | 16/45 X |
| 3,062,254 | 11/1962 | Keefe | 152/151 |
| 3,630,257 | 12/1971 | Goldberger | 152/323 X |
| 3,884,705 | 5/1975 | Blair | 106/14.05 X |

*Primary Examiner*—John J. Love
*Assistant Examiner*—D. W. Underwood
*Attorney, Agent, or Firm*—Jack E. Dominik

[57] ABSTRACT

A molded heavy duty wheel and method for making it, comprising a metallic core with a central opening and a circumferential flange, a moldable plastic or rubber material on the interior circumferential portion of the flange, and a tread of moldable plastic or rubber material on the exterior circumferential portion of the flange. The tread portion is bonded to the core to prevent slippage.

7 Claims, 10 Drawing Figures

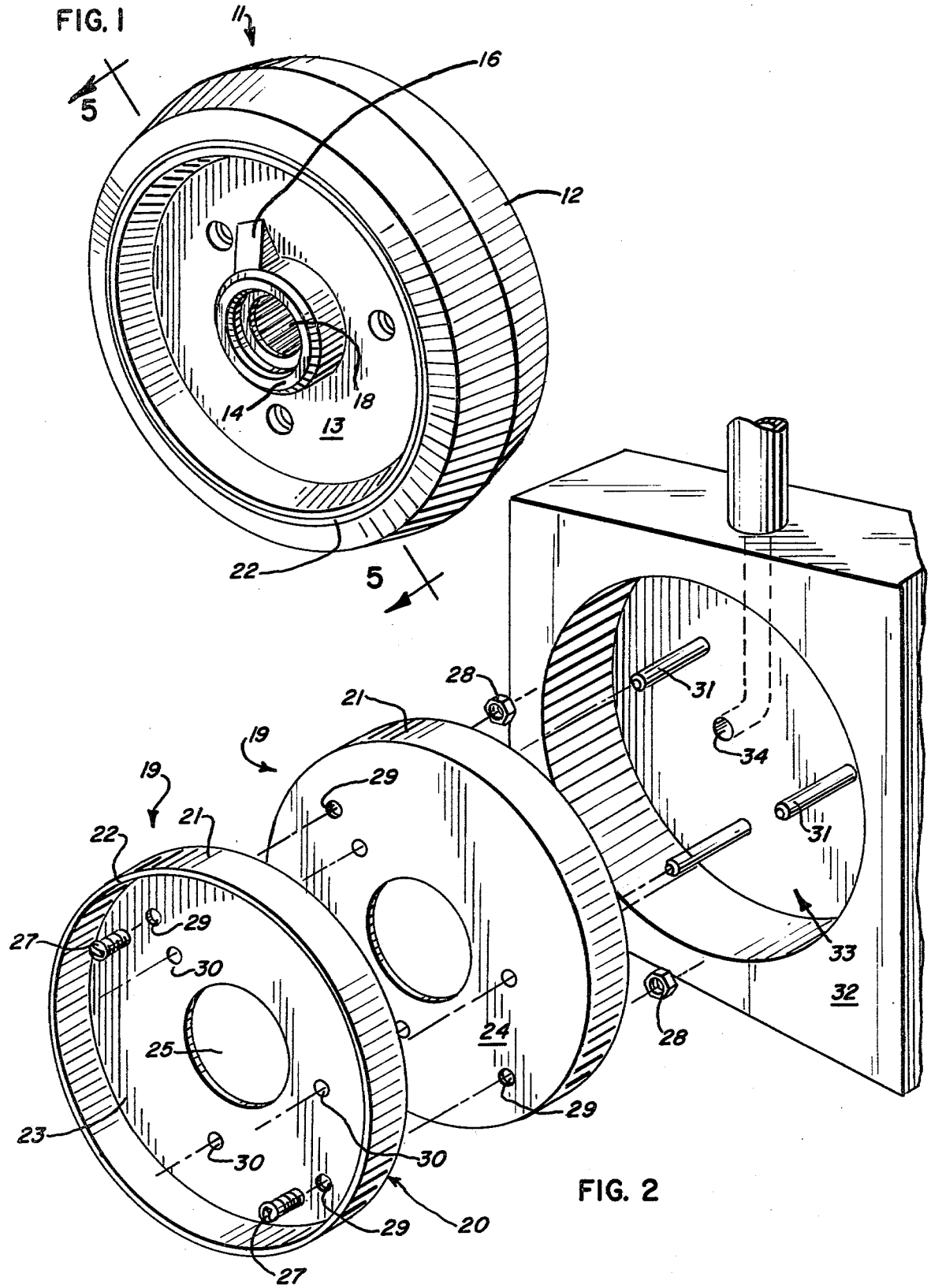

MOLDED HEAVY DUTY WHEEL

FIELD OF THE INVENTION

The present invention relates to wheels primarily used on material handling equipment such as hand trucks or lift trucks. The tread is a solid piece as opposed to pneumatic or semi pneumatic type tires. The wheel is designed to accept a bearing and axle assembly which forms part of the material handling equipment piece.

DESCRIPTION OF THE PRIOR ART

The prior art has dealt with various designs and configurations of wheels. Material handling vehicles present unique problems in the construction of a wheel which will withstand the heavy loads and high shearing forces which are incumbent upon the wheel during the transferring of the loads.

One approach is illustrated in U.S. Pat. No. 3,843,202 issued to Lacerte. Here the tire or tread is embedded in the rim by means of grooves. The rim or sides are exposed metal.

Likewise, in U.S. Pat. No. 3,952,786 to Kreling, et al., a tire is injection molded on the wheel. However, this wheel cannot withstand the extremely high loads experienced in material handling equipments, has no additional internal reinforcement, and the tread has a tendency to slip and separate from the internal web.

One such wheel having an internal reinforcing member is illustrated in U.S. Pat. No. 3,062,254 to Keefe. The shortcomings of the Keefe patent are that the imbedded rim serves only one purpose, that is as an internal reinforcing member. Furthermore, only one tire material is utilized to mold the entire wheel and the advantages of using a stronger material for the body and a more resilient material for the tread is not approached.

Other types of molded wheels are in U.S. Pat. No. 1,593,238 to Basler; U.S. Pat. No. 3,856,360 to Lindberg, et al; and U.S. Pat. No. 3,782,779 to Britnell.

An area unsuccessfully addressed by the prior art is to make a completely molded wheel which would be practically impervious to chemical contaminants found in atmospheres in which material handling equipment is used. Aluminum hub wheels suffer from corrosion and eventual breakdown in packing house environments wherein animal blood chemically reacts with the aluminum. Other exposed hubs tend to rust when in a humid environment. Bonding two plastic or rubber compounds or combination thereof together has heretofore been extremely difficult unless very exotic adhesives are used. Similarly, as stated in U.S. Pat. No. 1,576,924 to Malloy, a problem frequently encountered was the anchoring of a tire composed of resilient material to a wheel rim of rigid material.

SUMMARY OF THE INVENTION

The present invention relates to molded wheels, particularly for use on material handling equipment. The wheel itself includes three primary parts. Firstly, a metallic core having a central open portion and a circumferential flange. Secondly, a plastic material is molded around the interior part of the metallic core completely encapsulating it. A center opening is formed so that a bearing and related elements can be accepted. The outer circumferential portion of the metallic core is cleaned and a mastic is then applied. Thirdly, molded thread is then bonded to the exterior portion of the circumferential flange. The properties of the tread should be such that the material is picked from those available having good resilient and wear properties and susceptible to a strong bond to the flange.

The metallic core may be manufactured from any one of a number of various methods. Two dish like forms are secured in a base to base relationship in one approach. A second approach utilizes a tubular structure with a metal insert. A third approach employs a tube like structure with undercuts to firmly secure the central plastic material.

Generally the central plastic material is injection molded with a glass fill polypropylene. The outer circumference of the metallic core is treated and cleansed so that the tread can be applied. Desirably a urethane substance is utilized and has been found to be very satisfactory.

Thus, a completely encapsulated wheel is produced which is practically impervious to various environments. The tread is of a urethane material which results in long wear and smooth, silent operation. The body of the wheel is given strength by the metallic core, and further strengthed by the injected plastic material. Furthermore, a bearing passageway is formed during the injection process which will receive a bearing and axle assembly.

Accordingly, it is a principal object of the present invention to provide a wheel for use on material handling equipment which is impervious to a large majority of the environments one encounters in utilizing such equipment.

Furthermore, it is an object to produce a wheel which can be manufactured inexpensively while still providing a wheel which has strength and long life.

A further object of the invention is to provide a wheel with a tread selected from materials having good resilient and wear properties and susceptible of a bonded relationship to an interior metallic flange. It is also an object to produce a wheel with a plastic molded insert covering the interior portion of the wheel to add strength to the wheel and provide a central opening for the insertion of a bearing and axle assembly.

Yet another object of the present invention is to provide a wheel achieving the foregoing objectives and which has the bearing integrally molded as part of the central portion of the wheel.

DESCRIPTION OF THE DRAWINGS

Further objects and advantages of the present invention will become apparent as the following description proceeds, taken in conjunction with the accompanying drawings in which:

FIG. 1 is a perspective view of the molded wheel.

FIG. 2 is an exploded view in perspective of the two dish like halves before assembly and in position to be inserted within the injection mold.

DETAILED DESCRIPTION OF THE PREFERRED EMBODIMENT

Figure 3:
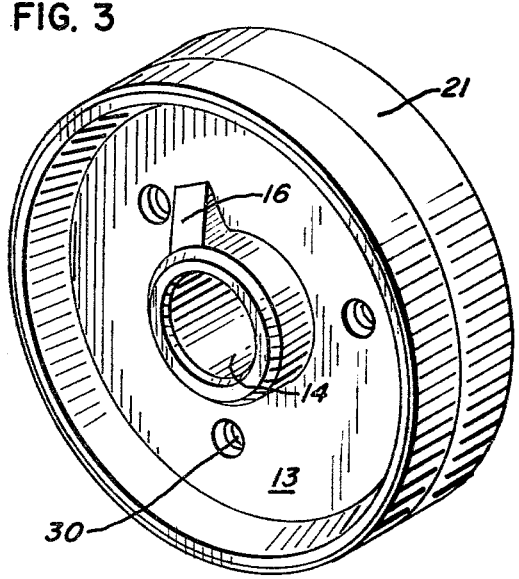
FIG. 3 is a perspective view of the wheel after the injection molding process with the plastic central portion molded thereon.

A molded heavy duty wheel 11 is illustrated in FIG. 1 of the drawings which incorporates a tread 12, a molded web or molded sides 13, a hub 14, and a bearing 18. The bearing 18 is chosen to fit within the hub 14 and of sufficient capacity to support the load which it will be subjected to.

The construction of the inner portions of the wheel are best illustrated in FIGS. 2, 8, 9 and 10. The backbone of the molded wheel 11 is a metal core 20 as seen in FIG. 2. In this illustration the metal core 20 is composed of two dish-like structures 19. Each dish includes an outer dish sides 23, dish bottoms 24 which are on the side opposite the dish sides 23 and a circumferential flange 21 which terminates in flange edges 22. There is a central opening 25 which as will be discussed later leaves an opening for the formation of the hub 14.

The dish-like structures 19 can be formed from conventional methods one being spinning a piece of sheet metal while bending in one edge to form the circumferential flange 21. A second method is stamping. The central opening 25 can be punched or formed in any one of a number of conventional ways.

The dish-like structures 19 are then joined in a bottom to bottom relationship. One joining method is to use a nut 27 and bolt 28 through aligned fastener holes 29. Alternative conventional means of fastening such as adhesives or welding are equally suitable. Positioning holes 30 are also found on the dish sides 23. The positioning holes 30 are also aligned to receive positioning pins 31 located in a mold cavity 33 in an injection mold 32.

The purpose of the positioning pins 31 is twofold. Firstly, they position the metal core 20 centrally within the mold cavity 33. Secondly, they add additional support to the dish sides 23 during the molding process. As the plastic material is injected through an inlet 34 extreme pressures are placed on the dish sides 23. The positioning pins 31 located on each half of the mold cavity 33 supply additional support required to keep the dish sides from bending during injection. Otherwise, a bent central portion of the metal core 20 results in a defective molded wheel.

The metal core 20 is manufactured from aluminum or steel. Metal of 14 gauge thickness has been found very acceptable to supply adequate strength while still being susceptible to economical metal forming processes.

Glass filled polypropylene is one of the preferred plastic like materials to be used in forming the molded sides 13. The plastic material should be chosen from those materials having good bonding characteristics, temperature, strength and corrosion resisting properties, and furthermore being susceptible to injection molding processes. Furthermore, glass filled polyproylene has a tendency to shrink less than many other plastic like materials after cooling. A minimum amount of shrinkage is desired so that the injected material will have less of a tendency to pull away from the interior of the circumferential flange 21.

FIG. 3 illustrates the molded wheel as it is removed from the injection mold. The circumferential flange 21 is exposed. At this stage the inner portion of the wheel has the molded sides 13 and the hub 14 fully formed. Optionally, a provision for a grease fitting 16 is provided. The positioning holes 30 can be seen in the molded product but in no way impair the strength or other characteristics of the wheel.

Figure 4:
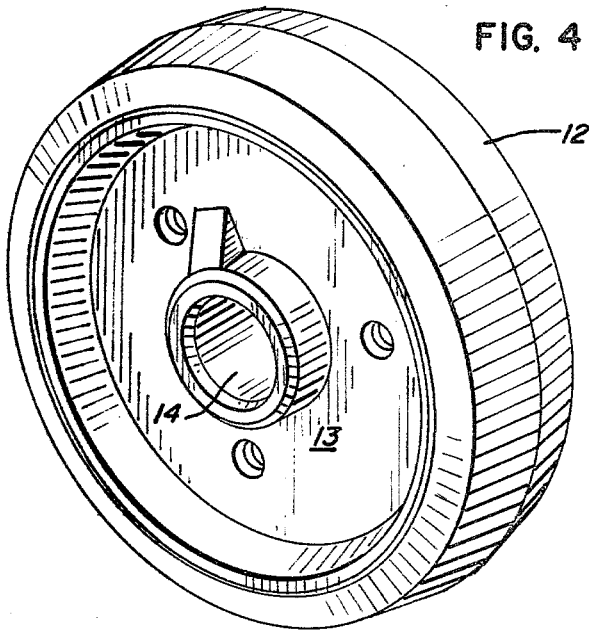
FIG. 4 is a perspective view of the wheel after the tread has been cast thereon.

The circumferential flange 21 is then prepared so that the tread 12 can be added. First the circumferential flange is degreased, followed by sand-blasting. A mastic such as one manufactured by the Whittaker Company of Dayton, Ohio as number AB 1153-66 is then applied and the partially finished molded wheel is baked. The tread 12 is then added. Urethane has been found to be extremely well suited for the tread portion of wheels used on material handling equipment. It has good resilient and wear properties, is susceptible of a bonded relationship to the circumferential flange 21, and is resistant to most chemicals encountered. Furthermore, it can be cast in a mold by pouring the liquid urethane into a mold designed to accept and form the wheel. The mold is formed so that the urethane is applied to the circumferential flange only. This results, after the hardening of the urethane, in a wheel as illustrated in FIG. 4.

The bearing 18 is then pressed into the hub 14. The dimension of the bearing 18 is such that a bearing race 35 is closely accepted in a very tight frictional fit with the hub 14. Thus if the roller portion of the bearing 18 must be replaced, it can be done so without removal of the bearing race 35.

Figure 5:
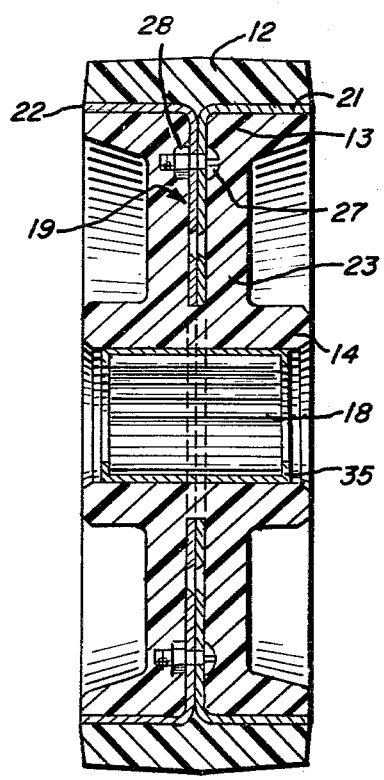
FIG. 5 is a cross sectional view taken along line 5—5 of FIG. 1.

As can be clearly seen in FIG. 5, the hub 14 is given additional structural strength from the dish-like structure 19. The hub 14 is sized to accept the various size bearings depending upon the load to be carried. The plastic material used for the central portion of the wheel must have the strength required to support the bearing and associated load.

Figure 6:
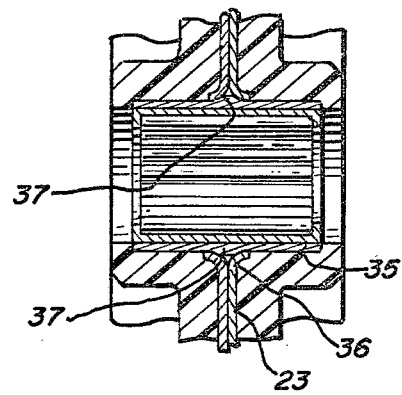
FIG. 6 is a fragmentary enlarged view of an alternate embodiment of the central passageway illustrating the reinforcing member retaining the bearing.

FIG. 6 illustrates an alternative embodiment of the dish sides 23 in which a Y-flange 36 is formed at the central opening 25 by flaring out the dish sides at the center. Before joining the dish sides, the bearing race 35 is positioned between the two halves This bearing race has a positioning ridge 37 centrally located thereon. As the dish sides 23 are joined together, the positioning ridge 37 is firmly retained between the Y-flange 36. The molded sides 13 are then injection molded to the metal core 20 resulting in the bearing race 35 being partially embedded within the molded sides 13.

Figure 7:
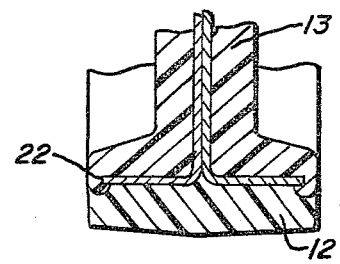
FIG. 7 is a fragmentary view of an alternate embodiment illustrating the central plastic material overlapping the edges of the metallic core.

FIG. 7 shows another preferred embodiment in which the molded sides 13 completely embed the flange edge 22 of the metal core 20. In this configuration absolutely no part of the circumferential flange is exposed to the atmosphere or subject to any contaminates therein.

Figure 8:
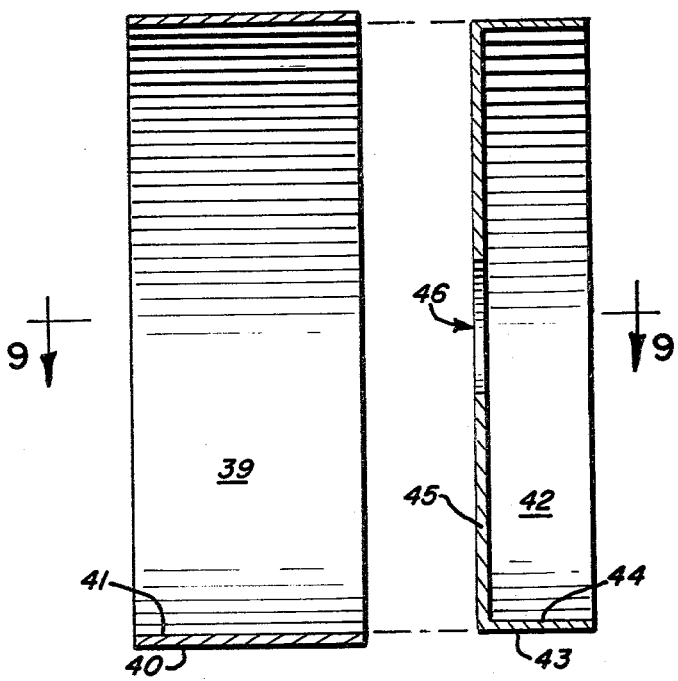
FIG. 8 is an alternate embodiment with portions removed of a metallic core with an insert exploded therefrom.

FIG. 8 illustrates an alternative means of making the metal core 20. Here a metal ring or core 39 is cut from tubing. The metal ring has an outside wall 40 and an inside wall 41. A dish insert 42 is then pressed into the metal ring 39. The dish insert 42 has an outside wall 43 and an inside wall 44. The dimension of the outside wall 43 is such that it substantially fills the interior of the metal ring 39. Thus the inside wall 41 will snugly receive the dish insert 42 in a tight frictional engagement. If desired, the dish insert 42 can be permanently affixed within the metal ring 39 by adhesives or welding. The dish insert further has a central opening 46 on an insert base 45 which serves the same purpose as the central opening 25 of the dish-like structures 19.

Figure 9:
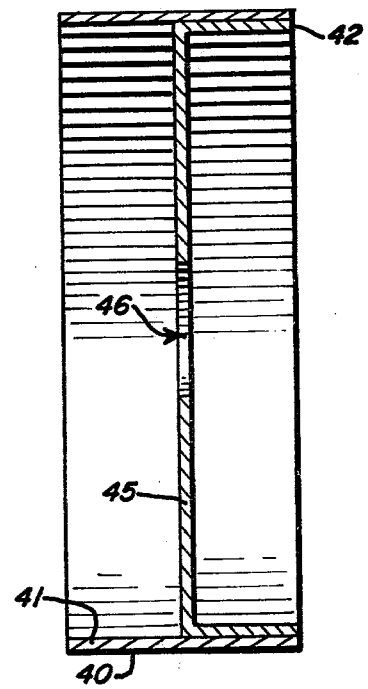
FIG. 9 is a cross sectional view of the alternate embodiment core taken along line 9—9 of FIG. 8.

FIG. 9 shows the dish insert 42 in position within the metal ring 39 ready for the injection molding process.

Figure 10:
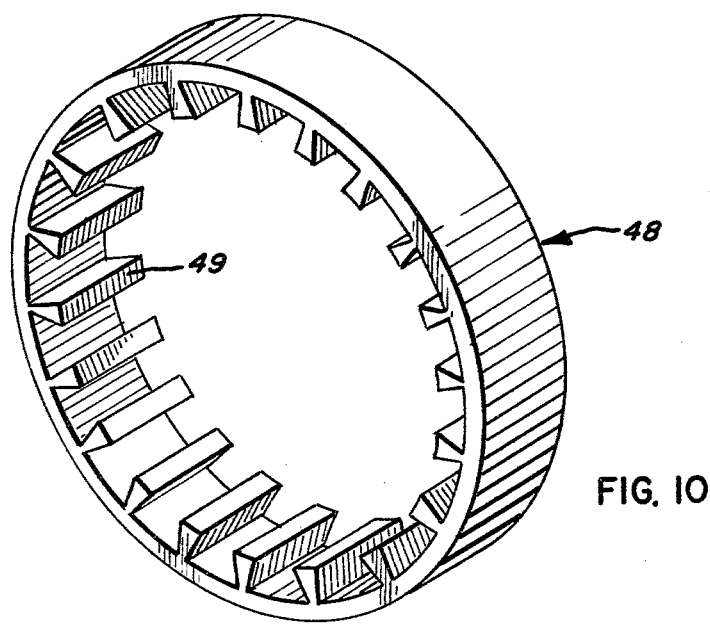
FIG. 10 is another alternative embodiment of a metallic core in perspective.

FIG. 10 is illustrative of yet another alternative embodiment of a metal ring or core 48 with internal projections 49. The central molded material would substantially fill the center of the metal ring 48 with the exception of an opening forming the hub 14. The projections 49 provide additional surface area and anchoring means for the molded center to adhere to. The tread still is applied in the same manner as in the previous embodiments.

It is important to note that the main function of the metallic core is to provide a bonding interface between two plastic or rubber type materials which normally could not be economically bonded one to the other. Further, the metal core supplies additional strength and rigidity to the finished wheel.

The tread also can be applied to the circumferential flange 21 or outside wall 40 of the metal ring 39 before the injection molding process is performed. After the tread has been cast around the metallic core 20, the partially finished wheel is then placed within an injection mold and the molded sides 13 then formed.

Various types of tread can be cast around the metal core 20. Soft rubber could be used where greater resiliency is required. Other tread materials can be picked for the ultimate properties desired in the tread.

Although particular embodiments of the invention have been shown and described in full here, there is no intention to thereby limit the invention to the details of such embodiments. On the contrary, the invention is to cover all modifications, alternatives, embodiments, usages, and equivalents of molded wheel as fall within the spirit and scope of the invention, specification, and the appended claims.

What is claimed is:

1. A wheel, having a body and a tread comprising, in combination,
   a metallic core formed from a tube-like member and a dish-like insert having a central opening received within the interior of said tube-like member,
   said metallic core having a circumferential bonding flange with an inside wall and an outside wall extending laterally a major portion of the tread width for bonding the tread to its outside wall,
   a central molded material formed around the interior portion of said metal core and interior to said bonding flange inside wall forming a body having an aperture at the center portion for the insertion of a bearing and related elements, said central molded material being selected from materials having good bonding, temperature, strength, and corrosion resisting properties,
   a molded heavy duty tread bonded to the exterior portion outside wall of said circumferential flange, said molded tread being selected from materials having good resilient and wear properties and susceptible of a bonded relationship to said flange outside wall,
   whereby a wheel is formed essentially of two moldable non-metallic type materials or combination thereof with a metal core for bonding the same as an interface.

2. A wheel as in claim 1 wherein said central molded material is made of glass filled polypropylene.

3. A wheel as in claim 1 wherein said central molded material is made of plastic.

4. A wheel as in claim 1 wherein said molded tread is made of urethane.

5. A wheel as in claim 1 wherein said molded tread is made of rubber.

6. A wheel as in claim 1 wherein said metallic core is made of aluminum.

7. A wheel as in claim 1 wherein said metallic core is made of steel.

* * * * *